UNITED STATES PATENT OFFICE 2,456,377

PROCESS OF SEPARATING 2,4-LUTIDINE AND 2,5-LUTIDINE

Francis E. Cislak and Merritt M. Otto, Indianapolis, Ind., assignors to Reilly Tar & Chemical Corporation, Indianapolis, Ind., a corporation of Indiana No Drawing. Application May 27, 1943,
Serial No. 488,744

4 Claims. (Cl. 260—290)

Our invention relates to the separation of 2,4-lutidine and 2,5-lutidine from each other.

These two compounds, 2,4-lutidine and 2,5-lutidine, are commonly associated with each other as ordinarily prepared from coal tar. But they are difficult to separate one from each other, because their properties are closely alike; especially their boiling points, so that separating them by fractional distillation is very difficult. These two compounds boil at very nearly the same temperature—about 157–158° C.

We have found, contrary to what might be expected, that hydrohalides selectively precipitate 2,4-lutidine hydrohalide from a mixture consisting essentially of 2,4-lutidine and 2,5-lutidine; and that the 2,4-lutidine hydrohalide, after separation, as by filtration, from the 2,5-lutidine and unreacted 2,4-lutidine, may if desired be reconverted in any suitable manner into the base 2,4-lutidine, as by treatment with an alkali-metal hydroxide. Thus, if we react a mixture of 2,4-lutidine and 2,5-lutidine with an amount of hydrogen halide sufficient to convert only the 2,4-lutidine into its hydrohalide, the 2,4-lutidine hydrohalide is selectively precipitated from the mixture. By the expression "2,4-lutidine hydrohalide" we mean a simple hydrohalide having the empirical formula $C_7H_9N \cdot HX$ where "X" is a halogen.

*Example 1.*—100 grams of a mixture containing roughly 70% of 2,4-lutidine and 30% of 2,5-lutidine is reacted with 20 grams of anhydrous hydrogen chloride. A precipitate is formed and is separated from the base mixture, as by filtration, and washed with benzene, toluene, or other solvent to remove any adhering base mixture. The separated precipitate is an enriched 2,4-lutidine hydrochloride. If further purification is desired this hydrochloride may be recrystallized, as from alcohol. The enriched, or purified 2,4-lutidine hydrochloride may be treated to reconstitute the base 2,4-lutidine, in any convenient manner, most conveniently by treatment with caustic soda. The freed 2,4-lutidine thus obtained is of a purity in the neighborhood of 95%.

*Example 2.*—Example 1 is repeated, save that instead of using anhydrous hydrogen chloride a molecular equivalent quantity of anhydrous hydrogen bromide is employed.

*Example 3.*—Example 1 is repeated, save that instead of using anhydrous hydrogen chloride a molecular equivalent quantity of anhydrous hydrogen iodide is employed.

*Example 4.*—Example 1 is repeated, save that instead of using anhydrous hydrogen chloride a molecular equivalent quantity of anhydrous hydrogen fluoride is employed.

In any of the above examples, instead of using an anhydrous hydrogen halide we may use an equivalent amount of an aqueous solution thereof and then remove the water by azeotropic distillation with benzene or toluene.

The precise quantity of hydrogen halide added to the mixture of the 2,4-lutidine and 2,5-lutidine to precipitate the hydrohalide of the former will depend of course upon the relative proportions of those two bases in the mixture, upon which base is desired in the purer form, and upon whether purity or yield is the desideratum. By using a quantity of hydrogen halide which is the molecular equivalent of the 2,4-lutidine present in the mixture maximum yields of both constituent bases will be obtained. Reducing the quantity of hydrogen halide used will reduce the yield, but increase the purity, of the precipitated 2,4-lutidine hydrohalide; while increasing the quantity of hydrogen halide will reduce the yield, but increase the purity, of the unprecipitated 2,5-lutidine.

We claim as our invention:

1. The process of separating a mixture consisting substantially of the bases 2,4-lutidine and 2,5-lutidine, which consists in reacting the mixture with an anhydrous hydrohalide, in an amount which is the molecular equivalent of the 2,4-lutidine present, to precipitate the 2,4-lutidine in the form of a solid, anhydrous, simple hydrohalide, and separating the precipitate from the liquid 2,5-lutidine.

2. The process of separating a mixture consisting substantially of the bases 2,4-lutidine and 2,5-lutidine, which consists in reacting the mixture with an anhydrous hydrogen chloride, in an amount which is the molecular equivalent of the 2,4-lutidine present, to precipitate the 2,4-lutidine in the form of a solid, anhydrous, simple hydrochloride, and separating the precipitate from the liquid 2,5-lutidine.

3. The process of separating a mixture consisting substantially of the bases 2,4-lutidine and 2,5-lutidine, which consists in reacting the mixture with an anhydrous hydrogen bromide, in an amount which is the molecular equivalent of the 2,4-lutidine present, to precipitate the 2,4-lutidine in the form of a solid, anhydrous, simple hydrobromide, and separating the precipitate from the liquid 2,5-lutidine.

4. The process of separating a mixture consisting substantially of the bases 2,4-lutidine and 2,5-lutidine, which consists in reacting the mixture with an anhydrous hydrogen fluoride, in an amount which is the molecular equivalent of the 2,4-lutidine present, to precipitate the 2,4-lutidine in the form of a solid, anhydrous, simple hydrofluoride, and separating the precipitate from the liquid 2,5-lutidine.

FRANCIS E. CISLAK.
MERRITT M. OTTO.

REFERENCES CITED

The following references are of record in the file of this patent:

UNITED STATES PATENTS

| Number | Name | Date |
|---|---|---|
| 1,965,828 | Fox | July 10, 1934 |
| 2,035,583 | Bailey | Mar. 31, 1936 |
| 2,288,281 | Huijser et al. | June 30, 1942 |
| 2,309,324 | McAllister et al. | Jan. 26, 1943 |
| 2,320,322 | Cislak et al. | May 25, 1943 |

FOREIGN PATENTS

| Number | Country | Date |
|---|---|---|
| 285,666 | Germany | July 9, 1915 |
| 570,675 | Germany | Feb. 18, 1933 |

OTHER REFERENCES

Maier-Bode et al., "Das Pyridin und seine Derivate" (Wilhelm Knapp, Halle, 1934); page 31.

Chem. Abstracts, vol. 26, p. 4936.

Jour. Amer. Chem. Soc., vol. 43, pp. 1936–1940 (1921).

Zeitschrift fur Angewandte Chemie, vol. 17, pp. 523–525 (1904).

Beilstein, "Handbuch der organischen Chemie," vol. XX (4th ed.) page 244.